United States Patent
Aldrich

(10) Patent No.: US 11,296,386 B2
(45) Date of Patent: Apr. 5, 2022

(54) EXPANDABLE ELECTROCHEMICAL CELL EFFLUENT CONTAINMENT DEVICE AND CORRESPONDING SYSTEMS AND METHODS

(71) Applicant: GS Yuasa Lithium Power Inc., Roswell, GA (US)

(72) Inventor: Curtis Aldrich, Roswell, GA (US)

(73) Assignee: GS Yuasa Lithium Power Inc., Roswell, GA (US)

( * ) Notice: Subject to any disclaimer, the term of this patent is extended or adjusted under 35 U.S.C. 154(b) by 313 days.

(21) Appl. No.: 16/269,445

(22) Filed: Feb. 6, 2019

(65) Prior Publication Data

US 2020/0251703 A1 Aug. 6, 2020

(51) Int. Cl.
*H01M 50/24* (2021.01)
*H01M 50/342* (2021.01)
*H01M 50/375* (2021.01)

(52) U.S. Cl.
CPC ....... *H01M 50/24* (2021.01); *H01M 50/3425* (2021.01); *H01M 50/375* (2021.01); *H01M 2200/10* (2013.01); *H01M 2200/20* (2013.01)

(58) Field of Classification Search
CPC .................................................. H01M 50/375
See application file for complete search history.

(56) References Cited

U.S. PATENT DOCUMENTS

| | | | |
|---|---|---|---|
| 6,048,638 A | 4/2000 | Pendalwar | |
| 8,753,760 B2 | 6/2014 | Sato et al. | |
| 9,660,237 B2 | 5/2017 | DeKuester et al. | |
| 9,960,455 B2 | 5/2018 | Specht et al. | |
| 2006/0166081 A1 | 7/2006 | Sauter et al. | |
| 2006/0292436 A1* | 12/2006 | Cook | H01M 50/10 429/56 |
| 2007/0072071 A1* | 3/2007 | Lee | H01M 10/34 429/162 |
| 2009/0111007 A1 | 4/2009 | Naganuma | |
| 2010/0075213 A1 | 3/2010 | Mehta et al. | |
| 2010/0136402 A1 | 6/2010 | Hermann et al. | |
| 2012/0189914 A1 | 7/2012 | Hara et al. | |
| 2014/0263355 A1* | 9/2014 | Verhulst | F17C 13/08 220/560.1 |
| 2015/0072175 A1 | 3/2015 | DeKeuster et al. | |
| 2016/0064710 A1 | 3/2016 | Nubbe et al. | |
| 2016/0107756 A1 | 4/2016 | Liske et al. | |
| 2017/0331089 A1 | 11/2017 | Hashimoto et al. | |

FOREIGN PATENT DOCUMENTS

DE 102012019676 4/2014
WO 2016141467 9/2016

OTHER PUBLICATIONS

Rey, Nathalie, "PCT Search Report and Written Opinion", PCT/US2020/016201; Filed Jan. 31, 2020; dated Jun. 19, 2020.

* cited by examiner

*Primary Examiner* — Brian R Ohara
(74) *Attorney, Agent, or Firm* — Philip H. Burrus, IV

(57) ABSTRACT

A containment system (100) includes a housing (106). A battery pack (104) is situated within the housing. One or more ports (114) are disposed along a surface of the housing. An effluent containment pouch (108) is coupled to the surface of the housing. The effluent containment pouch spans the one or more ports. The effluent containment pouch expands when an electrochemical cell (105) experiences a thermal runaway condition, capturing expelled effluent (116).

20 Claims, 10 Drawing Sheets

EXPANDABLE ELECTROCHEMICAL CELL EFFLUENT CONTAINMENT DEVICE AND CORRESPONDING SYSTEMS AND METHODS

BACKGROUND

Technical Field

This disclosure relates generally to electrochemical batteries, and more particularly to housing devices for electrochemical batteries.

Background Art

Lithium-ion and lithium-polymer cells offer numerous advantages over more traditional electrochemical cell technologies, such as lead-acid and nickel-based technologies. These advantages include higher energy density, lighter weight, more compact form factors, increased cycle life, reduced electrode plating, and reduced "memory" effects resulting from short charging cycles. These advantages allow lithium-based cells to be used in a wide variety of applications, ranging from electric vehicles to mobile telephones to wristwatches to aerospace satellites. Lithium-based cells are frequently deployed in applications where cells having high specific power, specific energy, power density, or energy density characteristics are desirable.

These advantages are not without drawbacks, however. A particular drawback of lithium-based cells resulting from their high energy density relates their failure modes. If, for example, a lithium-based cell is severely overcharged it becomes subject to a potentially unsafe failure mode known as "thermal runaway" that occurs when the cell begins generating more heat than can be removed by the system. A thermal runaway condition is an exothermic reaction that can be triggered by excessively high temperature within a cell. Since lithium cells include an oxidizer and fuel within the cell, when a thermal runaway condition occurs it can be difficult to stop. Thus, if a lithium-based cell is exposed to excessive heat or inadvertently becomes shorted, it can enter a thermal runaway condition in which it quickly combusts or suffers undesirable thermal expansion characteristics. Thermal runaway conditions can cascade from one cell to another as an initial event in a single cell propagates to neighboring cell.

When placed near other equipment or electronic circuitry, a thermal runaway condition can compromise not only the reliability of the cell, but that of the adjacent equipment as well. This damage risk is compounded when multiple cells are in close proximity within a small volume. It would be advantageous to have improved systems and devices that limit the risk of damage to nearby cells or equipment when one or more electrochemical cells experience a thermal runaway condition.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Figure 1:
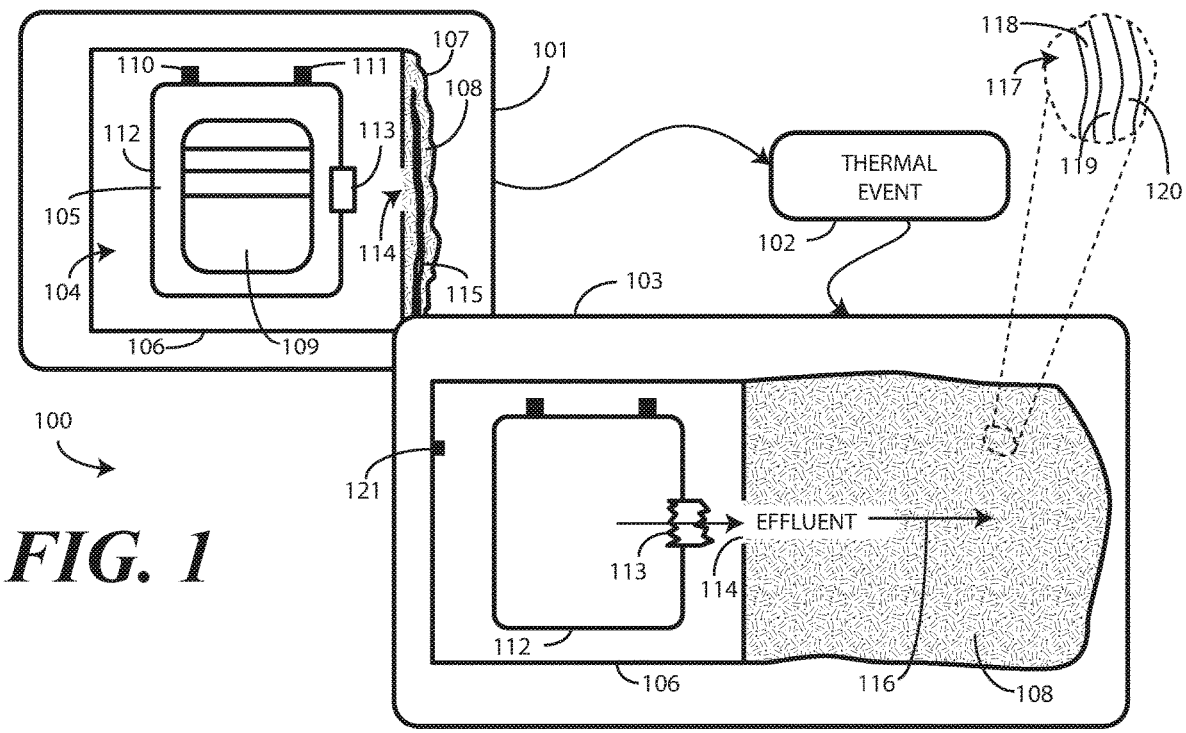
FIG. 1 illustrates one explanatory system in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to providing containment systems for electrochemical cells experiencing failure modes of operations. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially", "essentially", "approximately", "about" or any other version thereof, are defined as being close to as understood by one of ordinary skill in the art, and in one non-limiting embodiment the term is defined to be within 10 percent, in another embodiment within 5 percent, in another embodiment within 1 percent, and in another embodiment within 0.5 percent. The term "coupled" as used herein is defined as connected, although not necessarily directly and not necessarily mechanically.

As used herein, an electrochemical "cell" refers to an electrochemical storage device comprising an anode and a cathode, electrically separated by a separator in a housing. While separating the cathode and anode, the separator allows ions to pass through between cathode and anode. An electrolyte can be included within the cell. Examples of electrochemical cells include lithium ion cells and lithium polymer cells. By contrast, a "battery" is an electronic system that includes one or more cells that are electrically coupled together, optionally with control, charging, switching, balancing, or safety circuitry, to form an energy storage and delivery system. The cells within a battery can be operatively coupled together so as to deliver appropriate output voltages and current for a particular application. Also, reference designators shown herein in parenthesis indicate components shown in a figure other than the one in discussion. For example, talking about a device (10) while discussing figure A would refer to an element, 10, shown in figure other than figure A.

As noted above, lithium-based electrochemical cells, including lithium-ion cells and lithium-polymer cells, are often deployed where their high specific power, specific energy, power density, and/or energy density is desirable. For example, lithium-based cells are frequently used in unmanned spacecraft and satellites due to the large amounts of energy they can deliver per unit of weight and volume in comparison to other electrochemical cell technologies. It is highly desirable to minimize weight in these applications. For this reason, battery packs containing electrochemical cells and their corresponding management systems must remain as small and as light as possible.

At the same time, when a battery pack containing lithium-based cells is placed within close proximity to equipment on such a vehicle, proper operation of the equipment or the vehicle itself may be compromised by a single thermal runaway event. Accordingly, the risk of such an event occurring can have significant impact on lithium ion's value proposition.

This desire to minimize weight and size means that the inclusion of systems designed to contain, prevent, or extinguish thermal runaway conditions is often difficult or impossible. If a single cell in a battery back experiences a thermal runaway condition, the condition can spread to the next cell, and the next cell, eventually compromising the reliability of most or all cells in the pack. If not contained, the high temperatures that result can damage surrounding equipment. Reducing such temperatures by using a thermal damping material like water is not an option in an unmanned aircraft or satellite due to the added weight that such an extinguisher system would require. Preventing the spread by using large, heavy, metal, containers is also not an option, again due to the excessive weight as well as increased volume.

Embodiments of the disclosure provide a solution to this problem by providing a compact, deployable containment system that includes a rigid housing having one or more ports. In one or more embodiments, an expandable effluent containment pouch is coupled to the rigid housing and surrounds the one or more ports. In one or more embodiments, the expandable effluent containment pouch is manufactured from a light material that can tolerate and withstand the high temperatures of lithium cell effluent ejected from a cell during a thermal runaway condition. As used herein, "effluent" refers to elements of a lithium-based cell that experience thermal expansion during a thermal runaway event. This effluent can include portions of the anode, cathode, and/or separator, whether in solid, plasma, or liquid form, electrolyte, heavy metal ash, hydrofluoric acid, gasses, fluids, particles, heat, or other elements that emanate from the cell during the thermal runaway condition.

The inclusion of the expandable effluent containment pouch, which inflates and contains effluent during the thermal runaway condition, offers several advantages over prior art containment systems. Illustrating by example, the fact that the containment device is a pouch, rather than a pressure vessel, results in the additional mass required by the inclusion of the effluent containment pouch being minimized Additionally, since the effluent containment pouch is expandable, the additional volume required by the inclusion of the effluent containment pouch is also minimized.

In one or more embodiments, the fact that the effluent containment pouch is flexible results in the effluent containment pouch being able to deploy in any available direction and with minimum interference with adjacent objects. In one or more embodiments, the effluent containment pouch is designed to contain effluent from traditionally sized lithium-ion or lithium-polymer cells. This volume of effluent would be impractical with traditional containment approaches, as the increased weight and volume would not allow such prior art solutions to be used, especially in aerospace applications.

In one or more embodiments, the effluent containment pouch is attached directly to the housing of the containment system. In another embodiment, the effluent containment pouch is coupled to the housing of the containment system by way of a manifold or port. In the latter system, the effluent containment pouch can be located distally from the housing so that it may expand into a volume that is physically separated from the housing. This allows equipment and other gear to be collocated with the housing, while preventing such equipment and gear from being damaged during a thermal runaway event. Instead, should such an event occur, effluent will be directed from the housing, through the manifold or port, away from the equipment or gear, and into the effluent containment pouch.

In one or more embodiments, the effluent containment pouch of the containment system, when in the unactivated state, is not occupied by free air or other media. Accordingly, when in the activated state it is entirely available for effluent containment. In one or more embodiments, the effluent containment pouch is sized to accommodate the effluent from a single 18650 form-factor lithium-based cell. In other embodiments, the effluent containment pouch is sized to accommodate the effluent from multiple 18650 form-factor lithium-based cells. In still other embodiments, the effluent containment pouch is sized to accommodate one or more larger lithium-based cells.

Turning now to FIG. 1, illustrated therein is one explanatory containment system 100, performing in accordance with one or more steps 101,102,103 of a method, in accordance with one or more embodiments of the disclosure. The containment system 100 is shown in the unactivated state at step 101. However, after a thermal event occurs at step 102, the containment system 100 transitions to an activated state at step 103.

In this illustrative embodiment, the containment system comprises a battery pack 104 situated within a housing 106. In one or more embodiments, the battery pack 104 comprises a predetermined number of electrochemical cells stacked side-by-side, of which a single electrochemical cell 105 can be seen in the illustrative view of FIG. 1. In one or more embodiments, for example, the battery pack 104 may include ten or more electrochemical cells. For instance, the battery pack 104 may include between ten and thirty substantially identically shaped electrochemical cells in a side-by-side arrangement. The electrochemical cells are "substantially" identically shaped because, as will be understood by those of ordinary skill in the art having the benefit of this disclosure, irregularities in size and shape may occur during manufacture due to electrode lamination direction or thickness, for example.

In this illustrative embodiment, electrochemical cell 105 comprises a lithium-ion cell. While a lithium-ion cell is one type of electrochemical cell 105 suitable for use in the battery pack 104, it should be noted that embodiments of the disclosure are not so limited. Other types of cells, including lithium-polymer cells, or lithium ion polymer cells, can be substituted for the lithium-ion cell of FIG. 1. Other cell types suitable for use with embodiments of the disclosure will be obvious to those of ordinary skill in the art having the benefit of this disclosure.

In this illustrative embodiment, the electrochemical cell 105 is substantially rectangular. In the illustrative embodiment of FIG. 1, the electrochemical cell 105 has a flattened box shape capable of accommodating a flattened, wound electrode assembly 109. As will be described in more detail below with reference to FIG. 3, in one embodiment the electrochemical cell 105 includes a positive electrode terminal 110 that is electrically connected to a positive electrode of the flattened, wound electrode assembly 109. The electrochemical cell 105 also includes a negative electrode terminal 111 that is electrically connected to a negative electrode of the flattened, wound electrode assembly 109.

In one or more embodiments, the positive electrode terminal 110 and the negative electrode terminal 111 are mechanically coupled to a container 112 housing the flattened, wound electrode assembly 109. The container 112 can be manufactured from a variety of materials. Illustrating by example, the container 112 can be manufactured from a metal material, such as aluminum or steel. Alternatively, the container 112 can be manufactured from a thermoplastic or synthetic resin, or a high-melting point resin.

By placing electrochemical cells in a side-by-side arrangement the positive electrode terminal 110 of the electrochemical cell 105 and the negative electrode terminal 111 of the electrochemical cell 105 can be coupled to those of adjacent electrochemical cells by an electrical connector. By connecting electrochemical cells in either parallel or series in this manner, the battery pack 104 can be constructed to deliver a desired output voltage or current.

In one or more embodiments, the electrochemical cell 105 includes a safety valve 113. While shown on the side of the electrochemical cell 105 in the illustrative embodiment of FIG. 1, it should be noted that the safety valve 113 could be located in other locations, including on the opposite side of the electrochemical cell 105, between the positive electrode terminal 110 of the electrochemical cell 105 and the negative electrode terminal 111 of the electrochemical cell 105, or at the base of the electrochemical cell 105. Other locations suitable for the safety valve 113 will be obvious to those of ordinary skill in the art having the benefit of this disclosure.

In one or more embodiments, the safety valve 113 allows gas generated in the interior of the container 112 to escape. In one or more embodiments, where a thermal runaway condition occurs, the safety valve 113 ruptures and allows effluent to escape from the container 112. Details of one explanatory safety valve 113 will be described in more detail below with reference to FIG. 3.

In the illustrative embodiment of FIG. 1, the battery pack 104 is situated within a housing 106. In one or more embodiments, the housing 106 is manufactured from an impermeable material. As will be described in more detail with reference to FIG. 5 below, in one or more embodiments the housing 106 includes a base and a lid, which can be joined together to seal the battery pack 104 within the housing 106. The housing 106 can be of various sizes and shapes, so as to accommodate various cell shapes, geometries, arrangements, or quantities.

In one or more embodiments, the base and lid of the housing 106 can be manufactured from rigid materials that are generally impermeable to water and air, as well as other gasses and liquids. For example, in one embodiment the base and lid of the housing 106 are manufactured from metal, such as aluminum or steel. In another embodiment, the base and lid of the housing 106 are manufactured from a thermoplastic material. In still another embodiment, the base and lid of the housing 106 are manufactured from a composite material, such as carbon fiber or Kevlar.sup.™. In one or more embodiments, the base and lid of the housing 106 each comprise a coating, such as a vapor barrier coating.

In one or more embodiments, the housing 106 defines at least one port 114 along a side or major face of the housing 106. In one embodiment, the port 114 is simply an open aperture. In other embodiments, the port 114 can be sealed with a valve similar to the safety valve 113 coupled to the electrochemical cell 105, which allows gas generated in the interior of the housing 106 to escape. In one or more embodiments, where a thermal runaway condition occurs, the safety valve covering the port 114 ruptures, thereby allowing effluent to escape from the housing 106.

In one or more embodiments, an effluent containment pouch 108 is coupled to the housing 106 and spans the port 114. In one or more embodiments, the effluent containment pouch 108 functions as an expandable bladder to contain effluent emanating from any electrochemical cell 105 of the battery pack 104 should a thermal runaway condition occur. At step 101, the effluent containment pouch 108 is shown in an unactivated state. It is in a collapsed position, with one or more folds 115 collapsing the effluent containment pouch 108. The one or more folds 115 can comprise accordion folds in one embodiment. In another embodiment, the one or more folds 115 can comprise a gusset fold. Other types of folds suitable for inclusion in the one or more folds 115 will be obvious to those of ordinary skill in the art having the benefit of this disclosure.

The effluent containment pouch 108 can be coupled to the housing 106 in a variety of ways. In one embodiment, the effluent containment pouch 108 is bolted to the housing 106. In another embodiment, the effluent containment pouch 108 is sandwiched between a retention device, such as a metal gasket, and the housing 106. In still another embodiment, the effluent containment pouch 108 is welded to the housing 106. Other techniques for coupling the effluent containment pouch 108 to the housing 106 will be obvious to those of ordinary skill in the art having the benefit of this disclosure. In one or more embodiments, the effluent containment pouch 108 is hermetically sealed to the housing 106.

When a thermal runaway event occurs within at least one electrochemical cell 105, as shown at step 102, effluent 116 is guided into the effluent containment pouch 108, thereby causing the effluent containment pouch 108 to expand as shown at step 103. Where a safety valve 113 is included on one or both of the container 112 of the electrochemical cell 105 and/or the port 114, in one embodiment the thermal runaway event of step 102 causes these safety valve(s) 113 to rupture at step 103. The rupture of the safety valve(s) 113 allows the effluent 116 to be guided from the container 112 of the electrochemical cell 105, through the port 114, and into the effluent containment pouch 108 in one embodiment. As will be described in more detail below with reference to FIG. 4, in one or more embodiments baffles, guide walls, or other structures can be included to help guide the effluent 116 from the container 112 of the electrochemical cell 105, through the port 114, and into the effluent containment pouch 108 as well.

In one or more embodiments, the effluent containment pouch 108 is manufactured from a flexible, light, compact material. In one or more embodiments, the effluent containment pouch 108 is collapsed when in the unactivated state of step 101. In one or more embodiments, the effluent containment pouch 108 is tolerant of the anticipated temperatures and exposure duration associated with a thermal runaway event. In one or more embodiments, the effluent containment pouch 108 is sized so as to be capable of full containment of all effluent discharged, even if each and every electrochemical cell 105 of the battery pack 104 experiences its own thermal runaway event.

The effluent containment pouch 108 can be manufactured from a variety of materials. In one embodiment, the effluent containment pouch 108 is manufactured from multiple layers of flexible, heat-tolerant materials. In one or more embodiments, the effluent containment pouch 108 is configured as a multi-layer structure manufactured from a combination of the following materials: Nomex.sup.™, Kevlar.sup.™, graphite, ceramics, silicon carbide, silica fiber textiles, ballistic nylon, and Mylar.sup.™. In other embodiments, only a subset of these materials is used to manufacture the effluent containment pouch 108. Other compositions for the effluent containment pouch 108 will be obvious to those of ordinary skill in the art having the benefit of this disclosure.

To illustrate by example, in one embodiment the effluent containment pouch 108 is constructed from one or more multi-layer blankets, with each designed to be light, flexible and tolerant of effluent volumes and temperatures emitted from lithium-based cells. Each layer of the multi-layer blankets can comprise a combination of one or more of the following materials: Nomex.sup.™, Kevlar.sup.™, graphite, ceramic, silicon carbide, silica aerogel textiles, and Mylar.sup.™.

In one illustrative embodiment, moving from the interior surface of the effluent containment pouch 108 to the exterior surface of the effluent containment pouch 108, the effluent containment pouch 108 comprises a multi-layer blanket 117 that includes three layers: a first layer 118, a second layer 119, and a third layer 120. In one embodiment, the first layer 118 comprises silica aerogel insulation. The use of silica aerogel insulation as the layer closest to the electrochemical cell 105 experiencing the thermal runaway condition is advantageous in that it helps to preserve the physical integrity of the effluent containment pouch 108.

In one embodiment, the second layer 119 of the effluent containment pouch 108 comprises a fine layer of Kevlar.sup.™ cloth. In one or more embodiments, the second layer 119 functions to support stresses associated with localized effluent discharge and impact. Additionally, the use of Kevlar.sup.™ cloth as the second layer 119 of the multi-layer blanket 117 further functions to limit inflation pressure within the effluent containment pouch 108.

In one embodiment, the third layer 120 of the effluent containment pouch 108 comprises one of a bonded or free Mylar.sup.™ barrier. The use of bonded (stronger) or free (more supple) Mylar.sup.™ can be determined as a function of the effluent contamination tolerance required by the effluent containment pouch 108.

While the first layer 118, the second layer 119, and the third layer 120 described above are one example of a multi-layer blanket 117 that can be used to construct the effluent containment pouch 108, it should be noted that embodiments of the disclosure are not so limited. Numerous other lightweight constituent materials appropriate for anticipated temperatures and forces that must be endured may be considered without departing from the spirit and scope of the disclosure. Moreover, other suitable multi-layer blanket structures will be obvious to those of ordinary skill in the art having the benefit of this disclosure.

In one or more embodiments, the multi-layer blanket 117 is laminated or otherwise constructed or stacked together by placing panels of the first layer 118, the second layer 119, and the third layer 120 together. These panels can then be sewn together to form a closed effluent containment pouch 108 having a volume reflective of the space available and sized to accommodate a sufficient expansion volume. Other techniques for constructing the multi-layer blanket 117 will be obvious to those of ordinary skill in the art having the benefit of this disclosure.

In one or more embodiments, as shown at step 101, the effluent containment pouch 108 is a passive device that, until needed, has a very small mass and occupies minimal space. When a thermal runaway event occurs in at least one electrochemical cell 105, as shown at step 102, the effluent containment pouch 108 "deploys" by catching effluent 116 expelled from the at least one port 114 of the housing 106. While the at least one electrochemical cell 105 is emitting effluent 116, the effluent containment pouch 108 inflates due to the thermal expansion caused by the effluent emission.

The location at which the effluent containment pouch 108 is coupled to the housing 106 can be selected such that the effluent containment pouch 108 will only inflate in locations where there is sufficient space in a particular application. Advantageously, the effluent 116 can be kept away from sensitive equipment and/or personnel. Where used in a vehicular application, for example, the effluent containment pouch 108 can be configured to inflate in locations that prevent the effluent 116 from harming and/or contaminating vehicle systems and occupants. At the same time, the effluent containment pouch 108 allows the effluent 116 an opportunity to flow and/or expand away from the electrochemical cell 105 experiencing the thermal runaway condition, thereby potentially preventing adjacent electrochemical cells from also experiencing a thermal runaway condition.

Embodiments of the disclosure contemplate that the expansion of effluent 116 away from the electrochemical cell 105 experiencing the thermal runaway condition is an important consideration because the electrochemical cell 105 initially experiencing the thermal runaway condition frequently will be situated within close proximity of other electrochemical cells. Inclusion of the effluent containment pouch 108 allows the effluent 116 to expand to an area away from these adjacent electrochemical cells, thereby advantageously lowering effluent temperature. This, in turn, helps to mitigate the possibility of thermal runaway conditions occurring in adjacent electrochemical cells.

In one or more embodiments, the inclusion of the effluent containment pouch 108, which can be hermetically sealed to the otherwise impervious pressure chamber defined by the housing 106, allows the containment system 100 to surround or envelop each and every electrochemical cell 105 of the battery pack 104. If and when an electrochemical cell 105 enters a thermal runaway state, in one or more embodiments the effluent containment pouch 108 expands to contain the effluent 116. In some cases, basic containment and directing of effluent 116 may suffice. In other applications, a requirement for full containment with zero effluent escape may exist. In the latter situation, the coupling between the effluent containment pouch 108 and the housing 106, including all materials, joints, seams, and so forth, are configured to accommodate this requirement.

In one or more embodiments, the housing 106 comprises a vent 121. The vent 121 can perform a variety of functions. Illustrating by example, where the containment system 100 is designed for use in an aerospace application, the vent 121 can allow any air situated within the containment system 100 resulting from the manufacture of the same on earth to vent outwardly during ascent of the aerospace vehicle. Advantageously, this allows the interior of the containment system 100 to transition to a vacuum state. Of course, the inclusion of the vent 121 in now way interferes with the required effectiveness of the effluent containment pouch 108.

Figure 2:
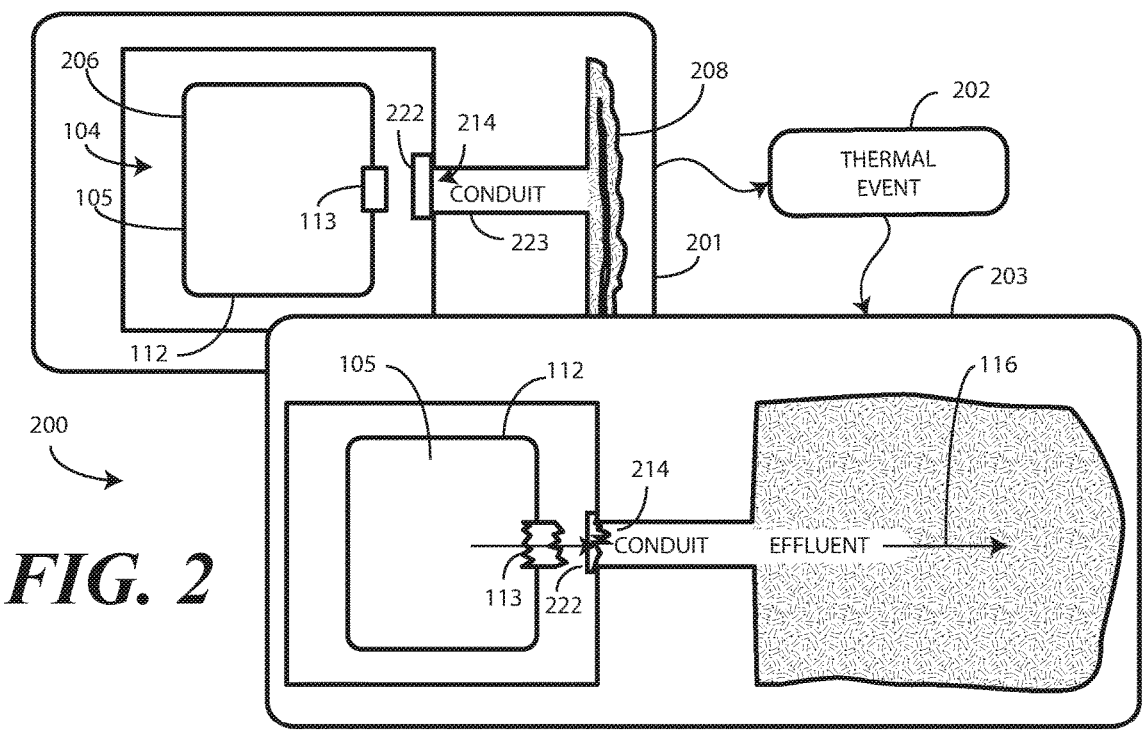
FIG. 2 illustrates another explanatory system in accordance with one or more embodiments of the disclosure.

Turning now to FIG. 2, illustrated therein is another containment system 200 configured in accordance with one or more embodiments of the disclosure. As with the containment system (100) of FIG. 1, the containment system 200 comprises a battery pack 104 situated within a housing 206. Again, the battery pack 104 comprises a predetermined number of electrochemical cells stacked side-by-side, of which a single electrochemical cell 105 can be seen. Electrical elements of the electrochemical cell 105 previously described, including the flattened, wound electrode assembly (109), the positive electrode terminal (110), and the negative electrode terminal (111) have been omitted for simplicity so as not to obscure the remaining elements shown in FIG. 2.

As before, the electrochemical cell 105 includes a safety valve 113. The safety valve 113 allows gas generated in the interior of the container 112 of the electrochemical cell 105 to escape. When a thermal runaway condition occurs, the safety valve 113 can rupture to allow effluent to escape from the container 112.

The battery pack 104 is situated within the housing 206. In one or more embodiments the housing 206 includes a base and a lid, which can be joined together to seal the battery pack 104 within the housing 206. As before, the housing 106 can be manufactured from a rigid material impermeable to vapor and gas, and can further be manufactured in various sizes and shapes, so as to accommodate various cell shapes, geometries, arrangements, or quantities.

In the illustrative embodiment of FIG. 2, the housing 206 defines at least one port 214 along a side or major face of the housing 206. In one embodiment, the port 214 is simply an open aperture. In the illustrative embodiment of FIG. 2, the port 214 is sealed with a safety valve 222 similar to the safety valve 113 coupled to the electrochemical cell 105. When a thermal runaway condition occurs, the safety valve 222 covering the port 114 ruptures, thereby allowing effluent to escape from the housing 206.

As with the containment system (100) of FIG. 1, the containment system 200 of FIG. 2 includes an effluent containment pouch 208. However, rather than being coupled to the housing 206 and spanning the port 214, in this illustrative embodiment the effluent containment pouch 208 is coupled to the housing 206 by a conduit 223. Embodiments of the disclosure contemplate that in some applications there may not be sufficient room for the effluent containment pouch 208 to expand into a volume immediately adjacent to the housing 206, as was the case in FIG. 1 above. However, there may be other locations within an installation, vehicle, or other application where there is sufficient volume for the effluent containment pouch 208 to expand. Accordingly, in the embodiment of FIG. 2 the containment system 200 includes a conduit 223 to channel effluent 116 from the housing 206 to the effluent containment pouch 208.

In one or more embodiments, the conduit 223 is made from materials similar to the effluent containment pouch 208. These materials include various combinations of Nomex.sup.™, Kevlar.sup.™, graphite, ceramics, silicon carbide, silica fiber textiles, ballistic nylon, and Mylar.sup.™. However, in other embodiments where the conduit 223 is not in the direct path of emerging effluent, such exotic materials may not be required. Instead, the conduit 223 could be manufactured from more conventional materials such as aluminum, lined aluminum, or steel.

Other than channeling effluent through the conduit 223, the operation of the containment system 200 of FIG. 2 is substantially similar to that described above with reference to FIG. 1. At step 201, the effluent containment pouch 208 is shown in an unactivated state. It is in a collapsed position, with one or more folds collapsing the effluent containment pouch 208.

When a thermal runaway event occurs within at least one electrochemical cell 105, as shown at step 202, effluent 116 is guided into the effluent containment pouch 208, thereby causing the effluent containment pouch 208 to expand as shown at step 203. Where a safety valve 113,222 is included on one or both of the container 112 of the electrochemical cell 105 and/or the port 214, in one embodiment the thermal runaway event of step 202 causes these safety valve(s) 113,222 to rupture at step 203. The rupture of the safety valve(s) 113,222 allows the effluent 116 to be guided from the container 112 of the electrochemical cell 105, through the port 214, and into the effluent containment pouch 208 in one embodiment at step 203.

Advantageously, the inclusion of the conduit 223 allows the location at which the effluent containment pouch 208 is positioned relative to the housing 106 to be selected such that the effluent containment pouch 208 will only inflate in locations where there is sufficient space in a particular application. Advantageously, the effluent 116 can be kept away from sensitive equipment and/or personnel. Where used in a vehicular application, for example, the effluent containment pouch 208 can be separated from the housing 206 by the conduit 223, thereby allowing the effluent containment pouch 208 to inflate in locations that prevent the effluent 116 from harming and/or contaminating vehicle systems and occupants. At the same time, the effluent containment pouch 208 allows the effluent 116 an opportunity to flow and/or expand away from the electrochemical cell 105 experiencing the thermal runaway condition, thereby potentially preventing adjacent electrochemical cells from also experiencing a thermal runaway condition.

Figure 3:
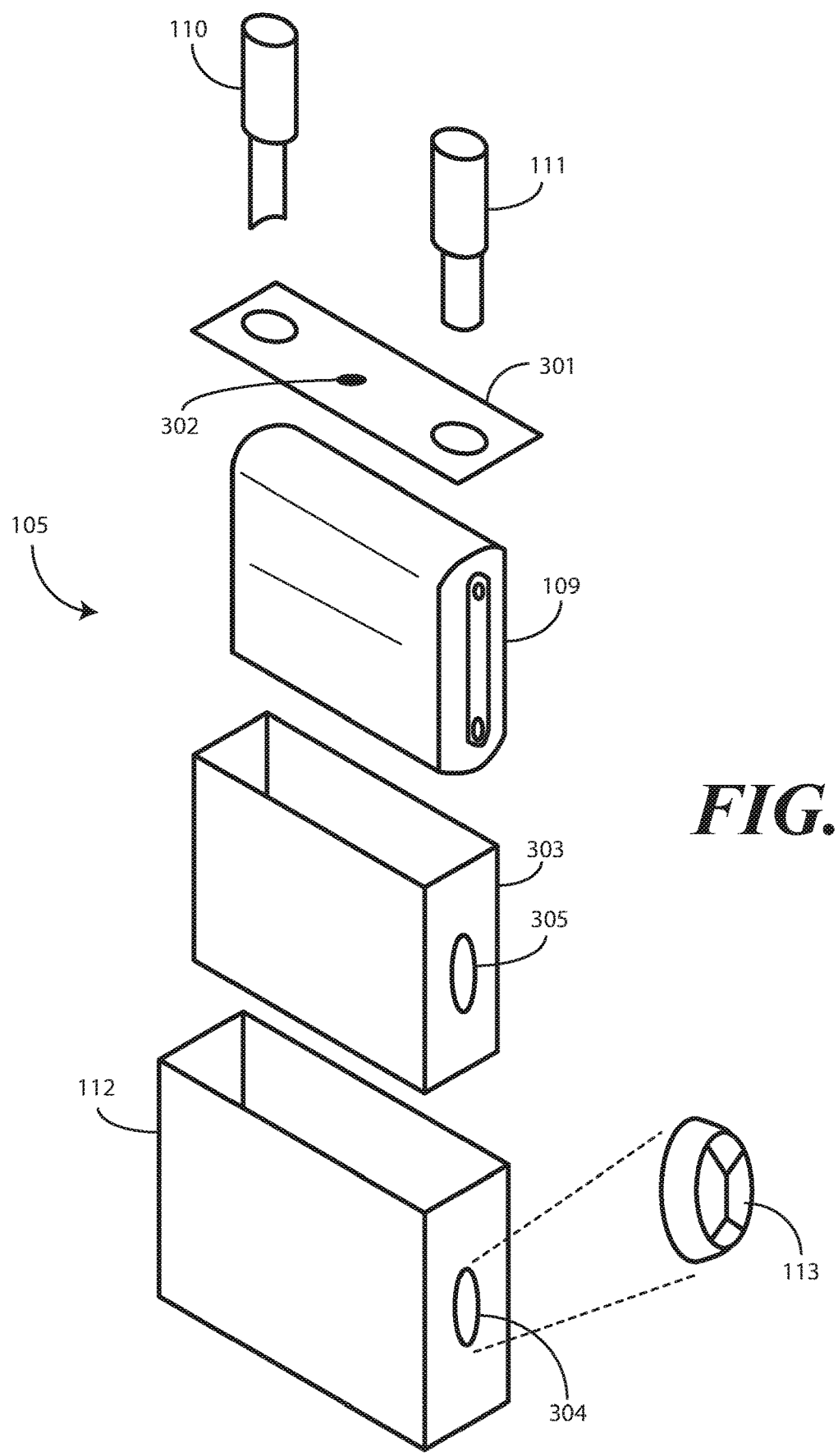
FIG. 3 illustrates one explanatory electrochemical cell in accordance with one or more embodiments of the disclosure.

Turning now to FIG. 3, illustrated therein is one illustrative electrochemical cell 105 suitable for use in one or more embodiments of the disclosure. The electrochemical cell 105 is illustrative only, and is provided to illustrate the functioning of the safety valve 113, where included. Other types of electrochemical cells could also be used with embodiments of the disclosure without departing from the spirit and scope of the disclosure. For example, rather than the rectangular cell shown in FIG. 3, an cylindrical cell, such as that having an 18650 form factor, could be substituted as well.

As previously described, the electrochemical cell 105 includes a container 112. A lid 301 is included, and seals the container 112 when the electrochemical cell 105 is assembled. The flattened, wound electrode assembly 109 situates within the container 112. In one embodiment, the lid 301 is welded to the container 112 once the flattened, wound electrode assembly 109 and other components are positioned therein.

The positive electrode terminal 110 and the negative electrode terminal 111 mechanically couple to the lid 301 and electrically couple to the flattened, wound electrode assembly 109. The flattened, wound electrode assembly 109 receives power from the positive electrode terminal 110 and the negative electrode terminal 111 during charging, and delivers power to the positive electrode terminal 110 and the negative electrode terminal 111 during discharge.

In one or more embodiments, the lid 301 can include a gas release valve 302. In one embodiment, when pressure within the electrochemical cell 105 increases, this gas release valve 302 opens and releases excess gas, thereby lowering the pressure within the container 112.

In one or more embodiments, an optional insulating sleeve 303 is positioned between the flattened, wound electrode assembly 109 and the container 112. Since the flattened, wound electrode assembly 109 includes an anode and cathode separated by a separator, its exterior can include exposed portions of either the anode or cathode. The inclusion of the insulating sleeve 303, where included, can prevent electrical interconnection of exposed portions of the flattened, wound electrode assembly 109 and the container 112. Gaskets, insulating rings, and other components can be included to perform similar functions for the lid 301.

In one or more embodiments, the electrochemical cell 105 includes the safety valve 113. In this illustrative embodiment, the safety valve 113 is placed on a minor side face of the container 112, and spans a port 305 defined in the side of the container 112. Where the insulating sleeve 303 is included, it can comprise a complementary port 305.

In one or more embodiments, the safety valve 113 has a smaller wall thickness than either the lid 301 or the container 112. This thinner wall allows the safety valve 113 to break open when the pressure inside the container 112 exceeds a predetermined threshold, thereby venting the container 112.

In one embodiment, the safety valve 113 is a separate component from the container 112, and is attached to the container 112 mechanically. In another embodiment, the safety valve 113 is an integral component of the container 112. For example, where the container 112 is manufactured from pressed aluminum, the safety valve 113 may simply be an integrated piece of aluminum that is merely pressed to a thinner thickness. One or more grooves can be included in the safety valve 113, thereby allowing it to more easily rupture in a thermal runaway condition. The grooves can further prevent pieces of the safety valve 113 from breaking away from the container 112 in such a situation.

In one or more embodiments, as pressure within the container 112 increases, the interior surface of the safety valve 113 initially expands outward. Where the grooves are included, this expansion causes tensile stress along each groove. Once the internal pressure exceeds a predetermined threshold, the grooves split and the safety valve 113 opens in an outward direction. This allows gas and/or effluent to expel from the container 112.

Figure 4:
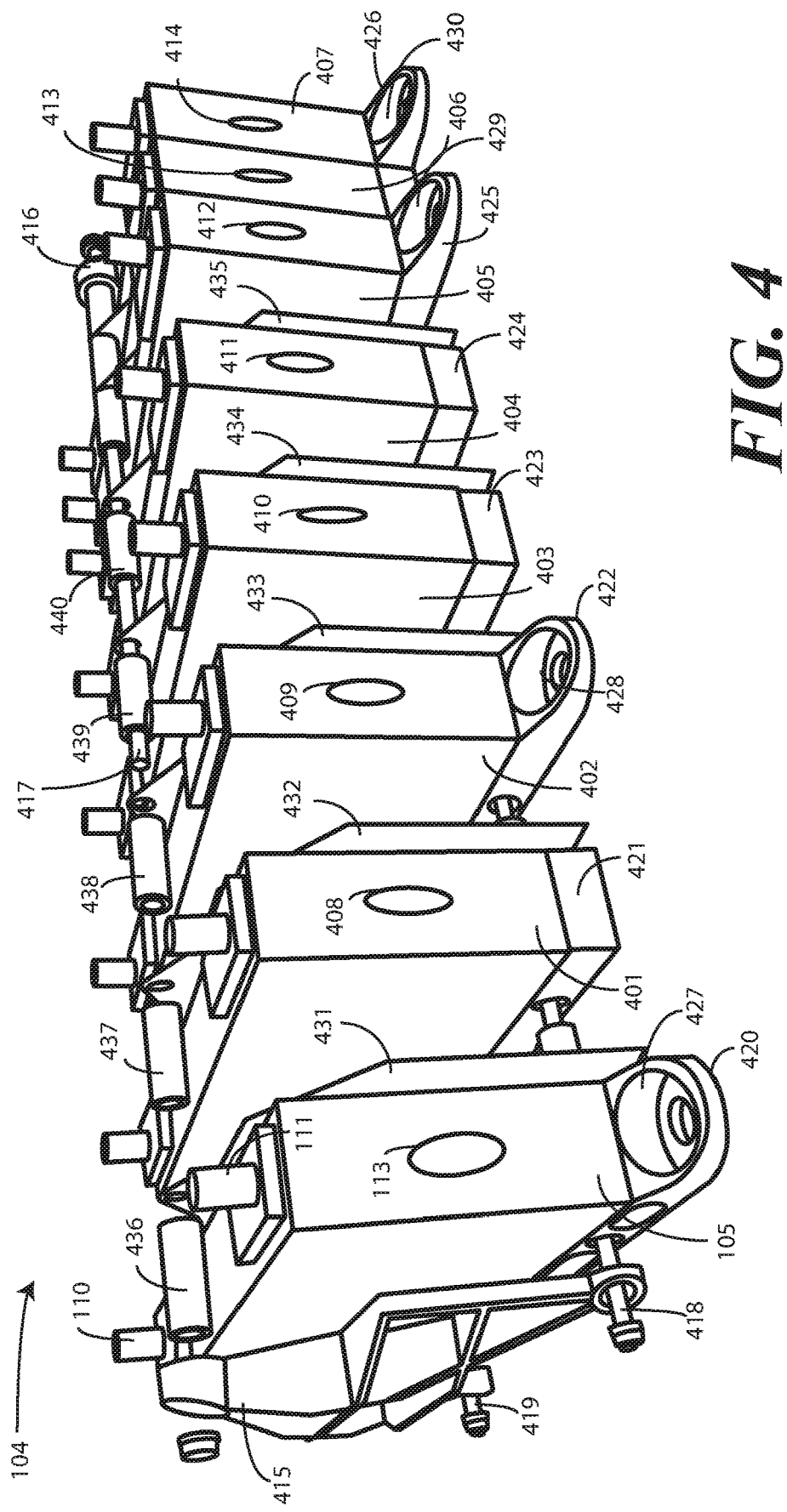
FIG. 4 illustrates one explanatory electrochemical cell assembly in accordance with one or more embodiments of the disclosure.

Turning now to FIG. 4, illustrated therein is one illustrative battery pack 104 configured in accordance with one or more embodiments of the disclosure. The battery pack 104 includes a plurality of electrochemical cells 105,401,402, 403,404,405,406,407. Each electrochemical cell 105,401, 402,403,404,405,406,407 includes a safety valve 113,408, 409,410,411,412,413,414 as previously described. In this embodiment, the electrochemical cells 105,401,402,403, 404,405, 406,407 are arranged such that each safety valve 113,408,409,410,411,412,413,414 is oriented in a common direction, which is out of the page and two the right as the battery pack 104 is viewed in FIG. 4.

As noted above, by placing electrochemical cells 105, 401,402,403,404,405,406,407 in a side-by-side arrangement, such as that shown in FIG. 4, the positive electrode terminal of one cell, e.g., positive electrode terminal 110 of electrochemical cell 105, and the negative electrode terminal of one cell, e.g., the negative electrode terminal 111 of electrochemical cell 105, can be coupled to those of adjacent electrochemical cells by an electrical connector, bus bar, or other electrically conductive device. By connecting electrochemical cells 105,401,402,403,404,405, 406,407 in either parallel or series in this manner, the battery pack 104 can be constructed to deliver a desired output voltage or current.

In one or more embodiments, to ensure that the electrochemical cells 105,401,402,403, 404,405,406,407 remain in a consistent position relative to each other, a compression device can be used to hold them in place. In this illustrative embodiment, the compression device includes two compression plates 415,416 that are coupled together by one or more compression rods 417,418,419.

Each compression plate 415,416 is positioned against the outer surfaces of electrochemical cell 105 and electrochemical cell 414, which are the outermost electrochemical cells in the illustrative battery pack 104 of FIG. 4. The compression rods 417,418,419 then pass through apertures in each compression plate 415,416, and include threaded end members in one embodiment. Nuts or other fasteners can then be applied to the threaded end members to pull the two compression plates 415,416 together, thereby retaining the electrochemical cells 105,401,402,403,404,405,406,407 in position.

In one or more embodiments, baseplates 420,421,422, 423,424,425,426 can be placed beneath the electrochemical cells 105,401,402,403,404,405,406,407. The inclusion of baseplates 420,421,422,423,424,425,426 advantageously serves multiple purposes. First, it allows the battery pack 104 to be attached to the base or lid of a housing of a containment system in one or more embodiments. Second, it provides a containment function in that if any one electrochemical cell experiences a thermal runaway condition, its corresponding baseplate provides a bounding function preventing effluent from moving in the downward direction. Third, where the baseplates 420,421,422,423,424,425,426 are manufactured from a thermally conductive material such as metal, they can be coupled to a thermal sink to provide a cooling function for each electrochemical cell 105,401,402, 403,404,405,406,407.

To limit the overall mass of the baseplates 420,421,422, 423,424,425,426, apertures or other sections of removed material can be included. Additionally, in one or more embodiments the baseplates 420,421,422,423,424,425,426 each include apertures through which the compression rods 418,419 may pass. In this illustrative embodiment, some of the baseplates 420,422,425,426 include bolt receivers 427, 428,429,430 that allow the battery pack 104 to be coupled to a base or lid of a containment system and/or a thermal sink.

Embodiments of the disclosure contemplate that if one electrochemical cell experiences a thermal runaway condition, it is advantageous to limit the condition to that single cell, thereby preventing propagation to other cells. To assist in this function, in one or more embodiments directional baffles 431,432,433,434,435 can be placed between each electrochemical cell 105,401,402,403,404,405,406,407. As will be described in more detail below with reference to FIG. 5, in a containment housing of a containment system can include one or more ports that allow effluent to be discharged into an effluent containment pouch.

Embodiments of the disclosure contemplate that effluent is generally expected to emerge from an electrochemical cell's safety valve 113,408,409,410,411,412,413,414. Embodiments of the disclosure further contemplate that materials in close proximity to the safety valve 113,408,409, 410,411,412,413,414, e.g., the directional baffles 431,432, 433,434,435, must be constructed of materials that tolerate extremely high temperatures. Accordingly, in one or more embodiments the directional baffles 431,432,433,434,435 are manufactured from a combination of Nomex.sup.™, Kevlar.sup.™, graphite, ceramic, silicon carbide, silica fiber textiles, and Mylar.sup.™. Elements of the battery pack 104 not in the direct path of emerging effluent can be manufactured by more traditional materials, such as aluminum or steel.

The inclusion of the directional baffles 431,432,433,434, 435 helps to direct the effluent to these ports, rather than to neighboring cells. Additionally, the directional baffles 431, 432,433,434,435 can provide a cooling function between the electrochemical cells 105,401,402,403,404,405,406,407 during normal operation. The directional baffles 431,432, 433, 434,435 prevent compression bulges from occurring in the electrochemical cells 105,401,402, 403,404,405,406,407 as well. They further assist in inhibiting heat flow from cell to cell, as well as constraining mechanical creep of the electrochemical cells 105,401,402,403,404,405,406,407 relative to the baseplates 420,421,422,423,424,425,426. Where the directional baffles 431,432,433,434,435 are included, spacers 436,437,438, 439,440 can be included between the directional baffles 431,432,433,434,435 to ensure equal pressure is applied by the compression rods 417,418,419.

Figure 5:
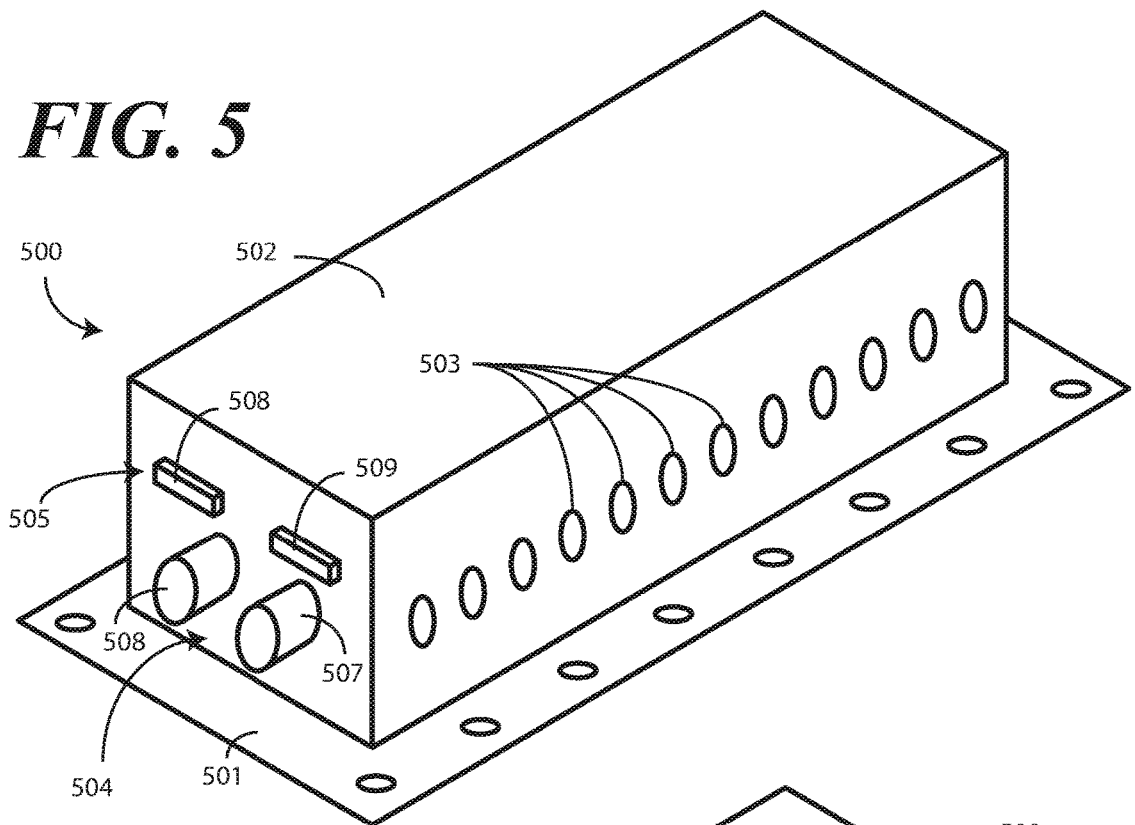
FIG. 5 illustrates one explanatory housing for an electrochemical cell assembly in accordance with one or more embodiments of the disclosure.

Turning now to FIG. 5, illustrated therein is one illustrative containment housing 500 configured in accordance with one or more embodiments of the disclosure. As shown, the containment housing 500 includes a base 501 and a lid 502. Each is configured with sufficient dimensions, for example, to accommodate the battery pack (104) of FIG. 4, which is coupled to the base 501 using the baseplates (420,421,422, 423,424,425,426), and in particular the baseplates (420,422, 425,426) that include the bolt receivers (427,428,429,430). The lid 502 is then attached to the base 501.

In one or more embodiments, the lid 502 of the containment housing 500 includes a plurality of ports 503. In one or more embodiments, the safety valves (113,408,409,410, 411, 412,413,414) of each electrochemical cell (105,401, 402,403,404,405,406,407) are aligned with a corresponding port 503 when the electrochemical cells (105,401,402,403, 404,405,406,407) are positioned within the containment housing 500. Where the directional baffles (431,432,433, 434, 435) are included, they can be aligned such that they abut the lid 502 of the containment housing 500 between each of the ports 503.

In one or more embodiments, the containment housing 500 includes a battery interface 504 and/or a telemetry interface 505. In this illustrative embodiment, the battery interface 504 includes a positive electrode terminal 506 and a negative electrode terminal 507. Power can be delivered to and from the electrochemical cells (105,401,402,403,404, 405,406,407) through the positive electrode terminal 506 and the negative electrode terminal 507.

The telemetry interface 505, where included, can include one or more data connectors 508,509 that can be used to check the status and health of each of the electrochemical cells (105,401,402,403,404,405,406,407). Embodiments of the disclosure contemplate that, for example, one electrochemical cell of the battery pack (104) disposed within the containment housing 500 can operate slightly differently compared to another cell. Consequently, systems have been developed to allow spacecraft electronics to perform diagnostic and charge balancing operations via interconnections disposed between individual cells. In one or more embodiments, external circuitry can access these interconnections via the one or more data connectors 508,509 in one or more embodiments.

In one or more embodiments, a compressible and impermeable seal or sealing gasket is positioned between the lid 502 and the base 501 of the containment housing 500. Such a sealing gasket can be manufactured from a variety of materials. The sealing gasket can be positioned within a recess defined along the base 501 of the containment housing 500. The lid 501 of the containment housing 500 may have a complementary mechanical feature that situates within the recess atop the sealing gasket in one or more embodiments.

Bolts or other fasteners can then be used to couple the base 501 of the containment housing 500 to the lid 502 of the containment housing 500 in one or more embodiments. These fasteners can cause compression of the sealing gasket, where included.

Figure 6:
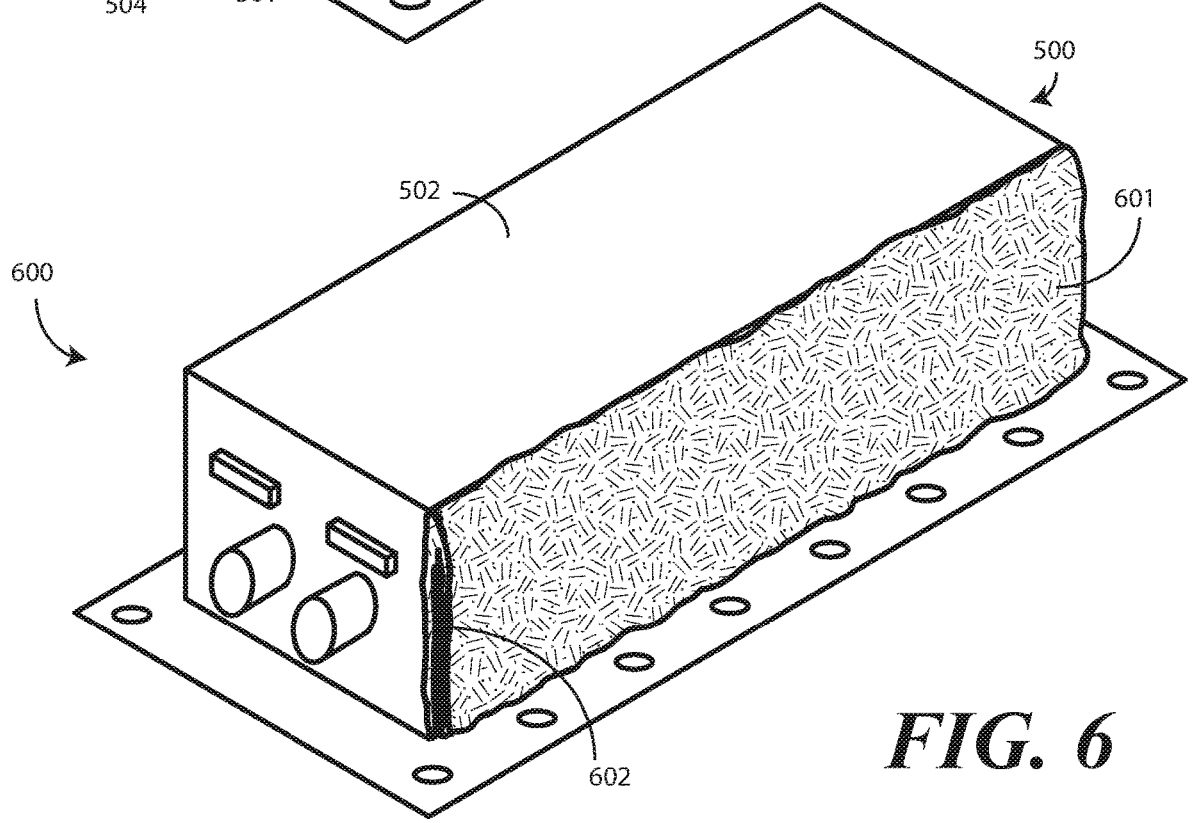
FIG. 6 illustrates one explanatory electrochemical cell containment system, in an unactivated state, in accordance with one or more embodiments of the disclosure.

Turning now to FIG. 6, illustrated therein is one explanatory containment system 600 configured in accordance with one or more embodiments of the disclosure. The containment system 600 includes the containment housing 500 of FIG. 5. The containment system 600 also includes an effluent containment pouch 601.

In one or more embodiments, the effluent containment pouch 601 is coupled to the lid 502 of the containment housing 500 and spans the ports (503). As before, the effluent containment pouch 601 functions as an expandable bladder and pressure container that contains effluent emanating from any electrochemical cell of the battery pack (104) situated within the containment housing 500. The effluent containment pouch 601 further works to contain any fire, heat, or exhaust gases expelled by an electrochemical cell of the battery pack (104) during a thermal runaway condition. As such, the effluent containment pouch 601 functions as a pressure vessel against the rapidly expanding combustion gasses emitted through the ports 503 during thermal runaway conditions. It further, by way of its expansion, offers a cooling action to protect surrounding structures.

As shown in FIG. 6, the effluent containment pouch 601 is in an unactivated state. It is in a collapsed position, with one or more folds 602 collapsing the effluent containment pouch 108. Where the containment system 600 is positioned in an outer space application, such as in a satellite, the effluent containment pouch 601 can be drawn against the side of the lid 502 of the containment housing 500 via vacuum as previously described. In one embodiment, the one or more folds 602 each comprise accordion folds. In another embodiment, the one or more folds 602 each comprise gusset folds. Other types of folds suitable for inclusion in the one or more folds 602 will be obvious to those of ordinary skill in the art having the benefit of this disclosure.

In one embodiment, the effluent containment pouch 601 is bolted to the side of the lid 502 of the containment housing 500. In another embodiment, the effluent containment pouch 601 is sandwiched between a retention device, such as a metal gasket, and the side of the lid 502 of the containment housing 500. In still another embodiment, the effluent containment pouch 601 is welded to the side of the lid 502 of the containment housing 500. Other techniques for coupling the effluent containment pouch 601 to the side of the lid 502 of the containment housing 500 will be obvious to those of ordinary skill in the art having the benefit of this disclosure. In one or more embodiments, the effluent containment pouch 601 is hermetically sealed to the side of the lid 502 of the containment housing 500.

Figure 7:
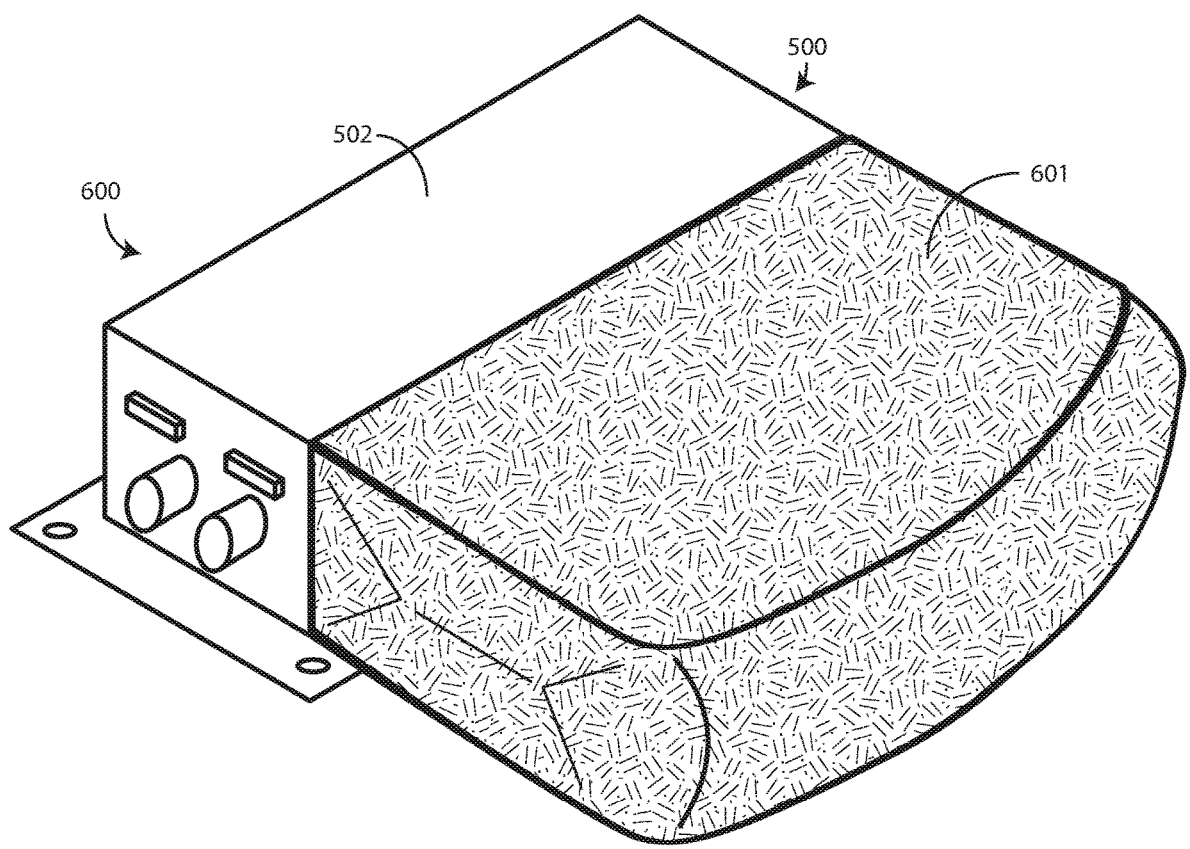
FIG. 7 illustrates one explanatory electrochemical cell containment system, in an activated state, in accordance with one or more embodiments of the disclosure.

Turning now to FIG. 7, illustrated therein is the containment system 600 during a thermal runaway event. Since the safety valves (113,408,409,410,411, 412,413,414) of each electrochemical cell (105,401,402,403,404,405,406,407) are aligned with a corresponding port (503), and the directional baffles (431,432,433,434, 435) are aligned such that they abut the lid 502 of the containment housing 500 between each of the ports (503), effluent is guided into the effluent containment pouch 601. This directing of the effluent into the effluent containment pouch 601 through the ports (503) causes the effluent containment pouch 601 to expand as shown in FIG. 7.

In one or more embodiments, the effluent containment pouch 601 is tolerant of the anticipated temperatures and exposure duration associated with a thermal runaway event. In one or more embodiments, the effluent containment pouch 601 is sized so as to be capable of full containment of all effluent discharged, even if each and every electrochemical cell of the battery pack (104) situated within the containment housing 500 experiences its own thermal runaway event, as previously described.

Figure 8:
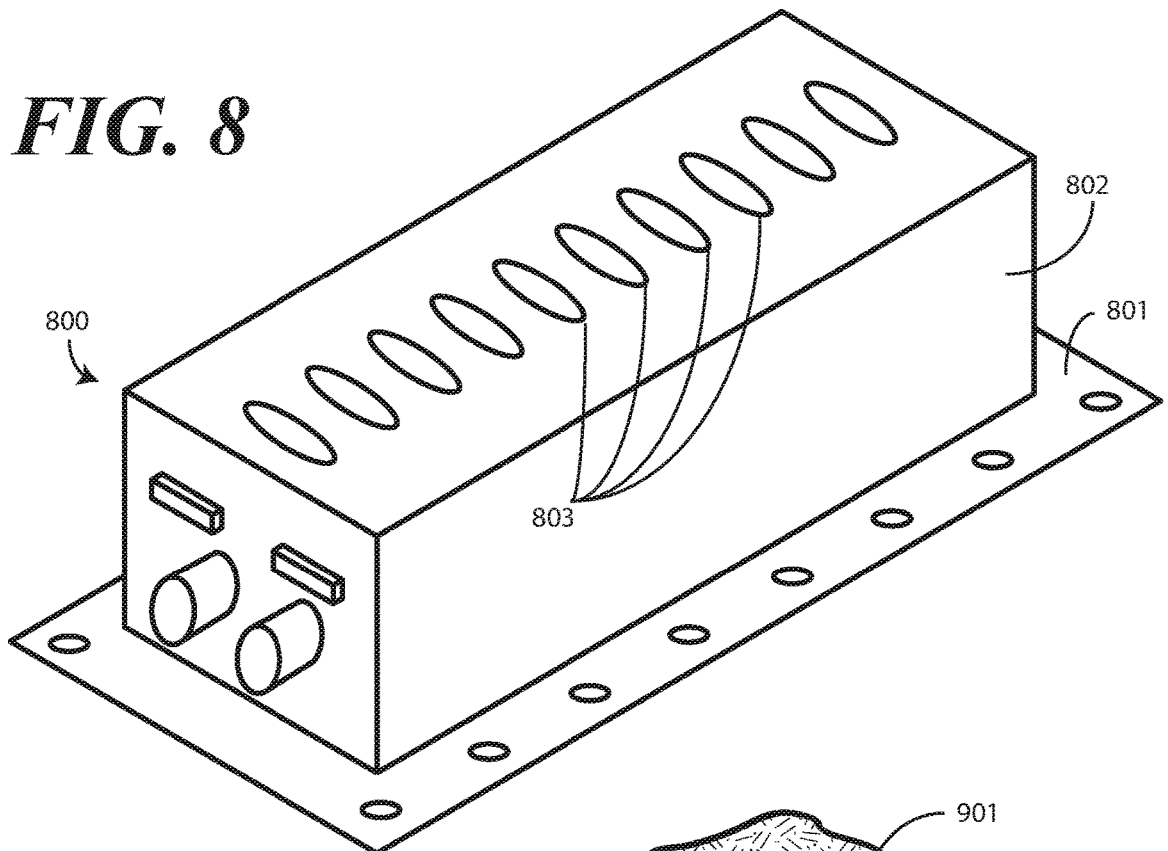
FIG. 8 illustrates another explanatory housing for an electrochemical cell assembly in accordance with one or more embodiments of the disclosure.

Turning now to FIG. 8, illustrated therein is another containment housing 800 configured in accordance with one or more embodiments of the disclosure. The containment housing 800 again includes a base 801 and a lid 802.

Recall from above that in some embodiments, electrochemical cells can include a gas release valve along the lid. The lid 802 of the containment housing 800 in the embodiment of FIG. 8 includes a plurality of ports 803 positioned along the top of the lid 802. Thus, if electrochemical cells are arranged in a battery pack (104) as shown in FIG. 4, with the lids of each electrochemical cell including a gas release valve facing the top of the lid 802, when this gas release valve opens and releases excess gas, it will be directed to the ports 803 disposed along the top of the lid 802, rather than to the side.

Figure 9:
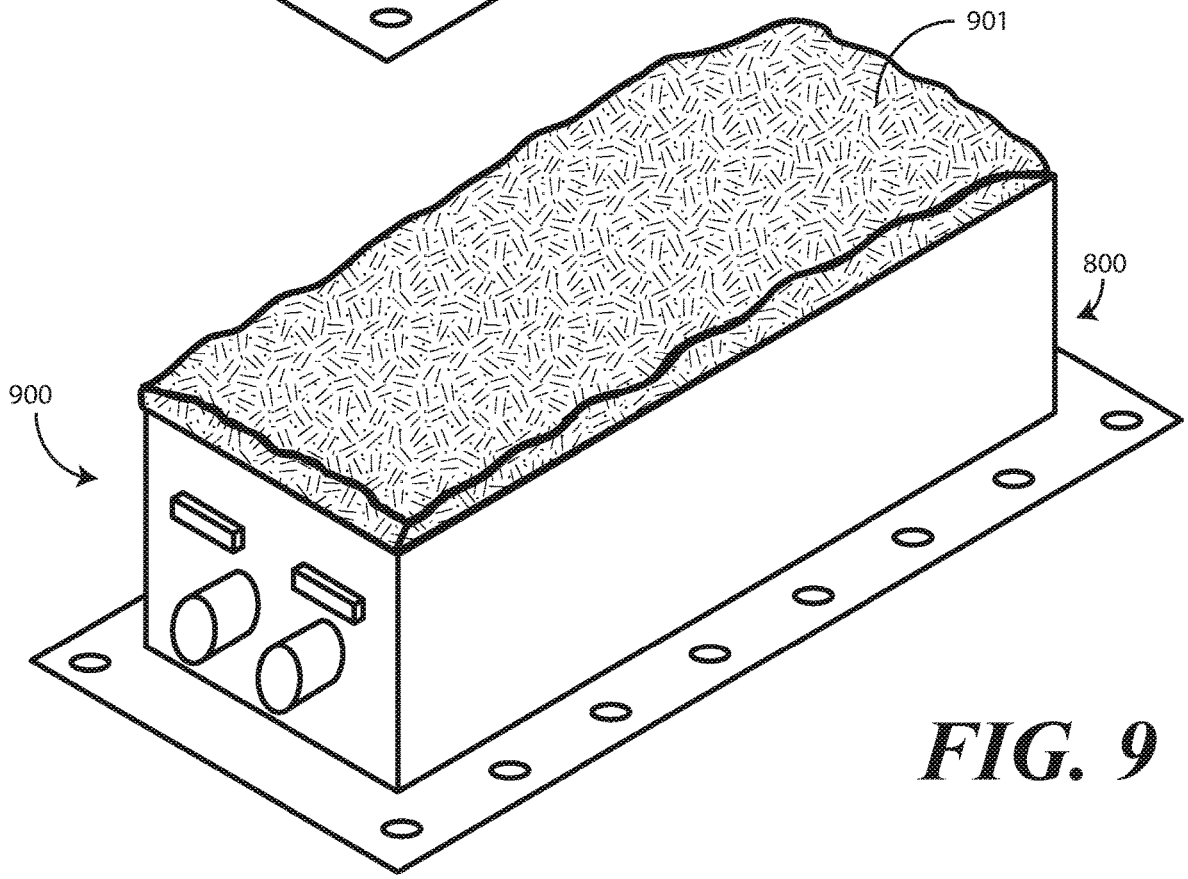
FIG. 9 illustrates another explanatory electrochemical cell containment system in accordance with one or more embodiments of the disclosure.

Turning now to FIG. 9, illustrated therein is another explanatory containment system 900 configured in accordance with one or more embodiments of the disclosure. The containment system 900 includes the containment housing 800 of FIG. 5. The containment system 900 also includes an effluent containment pouch 901.

In this illustrative embodiment, the effluent containment pouch 901 is coupled to the top of the lid 802 of the containment housing 900, thereby spanning the ports (803). As before, the effluent containment pouch 901 functions as an expandable bladder and pressure container that contains effluent emanating from any electrochemical cell of the battery pack (104) situated within the containment housing 800. The effluent containment pouch 901 further works to contain any fire, heat, or exhaust gases expelled by an electrochemical cell of the battery pack (104) during a thermal runaway condition. As such, the effluent containment pouch 901 functions as a pressure vessel against the rapidly expanding combustion gasses emitted through the ports 803 during thermal runaway conditions. It further, by way of its expansion, offers a cooling action to protect surrounding structures.

Figure 10:
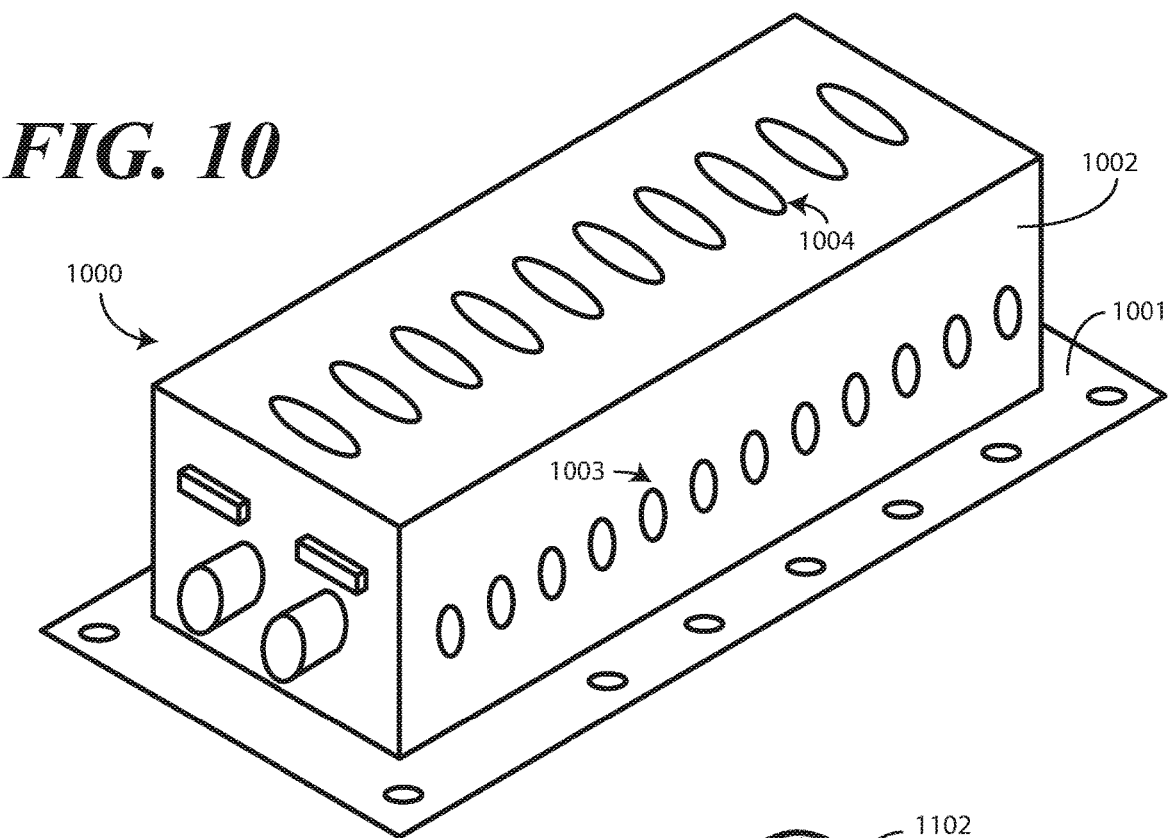
FIG. 10 illustrates still another explanatory housing for an electrochemical cell assembly in accordance with one or more embodiments of the disclosure.

Turning now to FIG. 10, illustrated therein is yet another containment housing 1000 configured in accordance with one or more embodiments of the disclosure. The containment housing 1000 again includes a base 1001 and a lid 1002.

In this illustrative embodiment, the lid 1002 of the containment housing 1000 includes a plurality of ports 1003 positioned along a side of the lid 1002. The containment housing 1000 also includes another set of ports 1004 positioned on the top of the lid 1002. While two sides are shown as including ports in FIG. 10, it should be noted that any number of sides of the containment housing 1000 could include ports.

Figure 11:
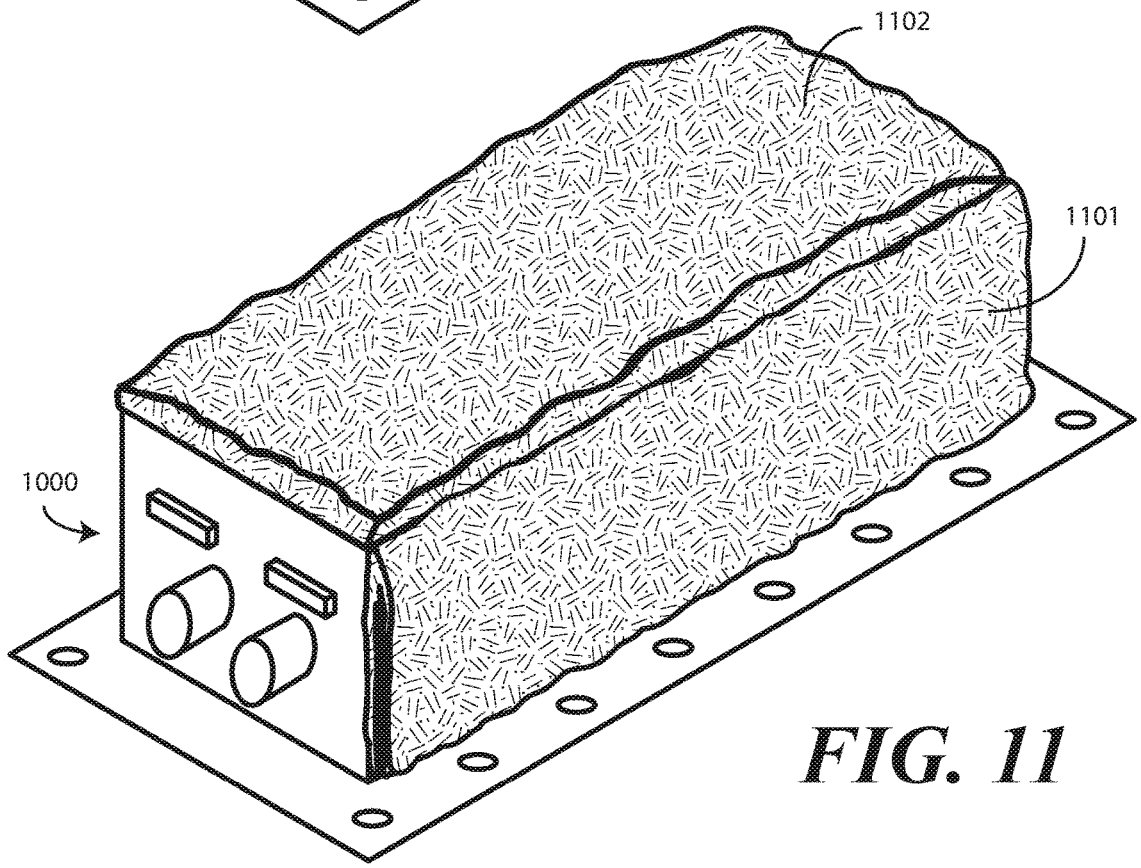
FIG. 11 illustrates still another explanatory electrochemical cell containment system in accordance with one or more embodiments of the disclosure.

As shown in FIG. 11, the inclusion of ports on multiple sides of the containment housing 1000 allows multiple effluent containment pouches 1101,1102 to be attached to the containment housing 1000. In this illustrative embodiment, since the containment housing 1000 includes a plurality of ports (1003) positioned along its side and another set of ports (1004) positioned on the top, a first effluent containment pouch 1101 is attached to the side, while a second effluent containment pouch 1102 is positioned on the top.

This allows each effluent containment pouch 1101,1102 to be half the size, for example, of the effluent containment pouch (601) of FIGS. 6-7, while still containing the same amount of effluent. As more effluent containment pouches are added to the containment housing 1000, the size of each effluent containment pouch can become smaller. The number and placement of effluent containment pouches will vary based upon application. However, in one or more embodiments, a containment system configured in accordance with one or more embodiments of the disclosures includes a plurality of effluent containment pouches positioned at different locations along a containment housing 1000. The embodiment of FIG. 11 is merely one example, as numerous others will be obvious to those of ordinary skill in the art having the benefit of this disclosure.

One note regarding the sizing of the effluent containment pouch. The inventor has found that if a containment housing surrounds a relatively low number of electrochemical cells, e.g., 7-8 cells, then a relatively large portion of the resulting battery pack will need to be contained within the effluent containment pouch when a thermal runaway event occurs. By contrast, when the containment housing surrounds a larger number of electrochemical cells, e.g., twenty-four cells or more, then a relatively small portion of the resulting battery pack will become involved in most thermal runaway conditions.

Accordingly, the effluent containment pouch can be smaller when the number of electrochemical cells becomes larger. This is counterintuitive. However, to illustrate by example, an "appropriately sized" effluent containment pouch might occupy a volume of eight times the volume of the pack when there are ten or fewer electrochemical cells in a battery pack. By contrast, an effluent containment pouch may need to occupy a volume of only 1.5 times the volume of the battery pack where there are more than twenty electrochemical cells.

Thus, for smaller numbers of electrochemical cells the effluent containment pouch may become larger than for larger numbers of cells. As such, in one or more embodiments when a battery pack includes less than ten electrochemical cells, the volume of the effluent containment pouch is greater than three times the volume of the battery pack. By contrast, in an embodiment when the battery pack includes more than twenty electrochemical cells, the volume of the effluent containment pouch is less than three times the volume of the battery pack.

In one embodiment where a battery pack includes less than ten electrochemical cells, the volume of the effluent containment pouch is greater than five times the volume of the battery pack. By contrast, in an embodiment when the battery pack includes more than twenty electrochemical cells, the volume of the effluent containment pouch is less than three times the volume of the battery pack. In one embodiment where a battery pack includes less than ten electrochemical cells, the volume of the effluent containment pouch is greater than seven times the volume of the battery pack. By contrast, in an embodiment when the battery pack includes more than twenty electrochemical cells, the volume of the effluent containment pouch is less than two times the volume of the battery pack.

Figure 12:
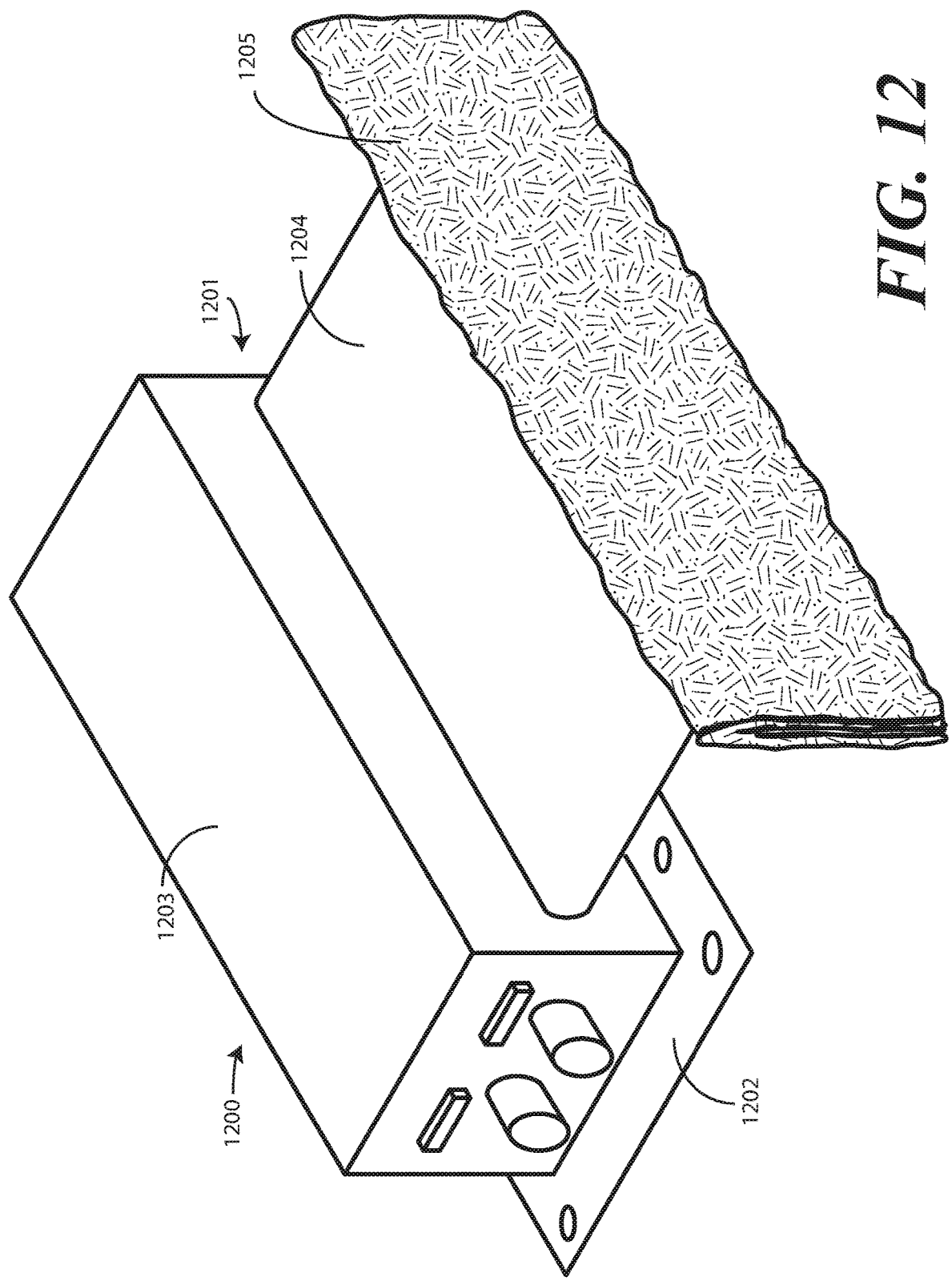
FIG. 12 illustrates yet another explanatory electrochemical cell containment system in accordance with one or more embodiments of the disclosure.

Turning now to FIG. 12, illustrated therein is another containment system 1200 configured in accordance with one or more embodiments of the disclosure. As before, a battery pack (104) is situated within a containment housing 1201 that includes a base 1202 and a lid 1203. The base 1202 and the lid 1203 can be joined together to seal the battery pack (104) within the containment housing 1201.

In the illustrative embodiment of FIG. 12, the lid 1203 of the containment housing 1201 defines at least one port (503) along a side just as did the lid (502) of the containment housing (500) of FIG. 5. However, rather than having an effluent containment pouch (601) that spans the ports (503), a conduit 1204 spans each of the ports (503) and extends to the effluent containment pouch 1205. While the conduit 1204 is shown in FIG. 12 as a substantially straight tube, embodiments of the disclosure are not so limited. The conduit 1204 can include turns, twists, redirection, and other changes in shape to direct effluent along the path defined by the conduit 1204 to the effluent containment pouch 1205.

The containment system 1200 of FIG. 12 allows a designer to locate the effluent containment pouch 1205 at a location that is distally displaced from the containment housing 1201. In satellite and other applications, there may not be sufficient room for the effluent containment pouch 1205 to expand into a volume immediately adjacent to the containment housing 1201. However, there may be other locations where there is sufficient volume for the effluent containment pouch 1205 to expand. The inclusion of a conduit 1204 between the containment housing 1201 and the effluent containment pouch 1205 advantageously allows the effluent containment pouch 1205 to be positioned into such a volume, with effluent traveling through the different locations within the conduit 1204.

Figure 13:
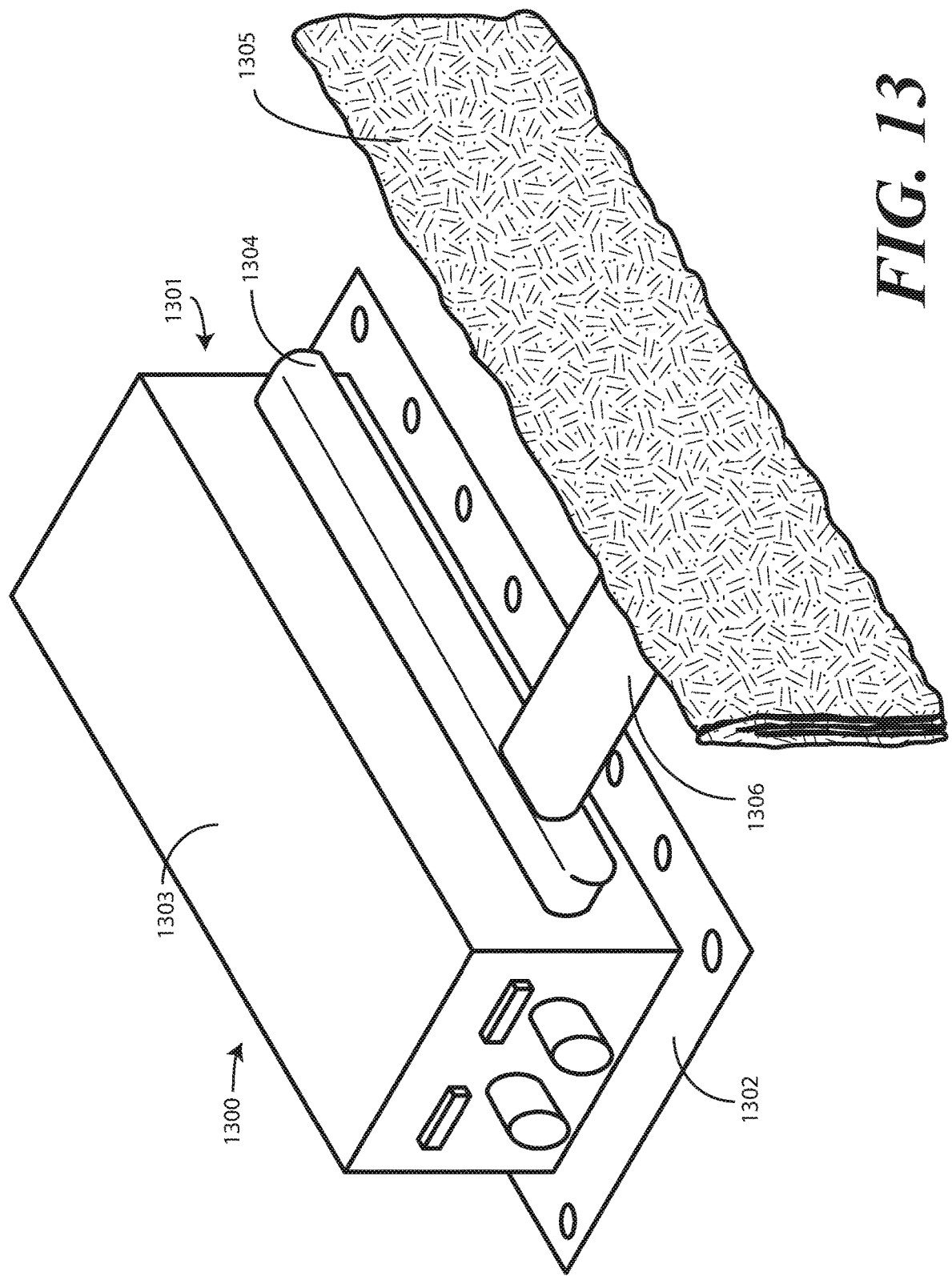
FIG. 13 illustrates another explanatory electrochemical cell containment system in accordance with one or more embodiments of the disclosure.

Turning now to FIG. 13, illustrated therein is another containment system 1300 configured in accordance with one or more embodiments of the disclosure. As before, a battery pack (104) is situated within a containment housing 1301 that includes a base 1302 and a lid 1303. The base 1302 and the lid 1303 can be joined together to seal the battery pack (104) within the containment housing 1301.

In the illustrative embodiment of FIG. 13, the lid 1303 of the containment housing 1301 defines at least one port (503) along a side just as did the lid (502) of the containment housing (500) of FIG. 5. However, rather than having an effluent containment pouch (601) that spans the ports (503), a conduit 1304 spans each of the ports (503). This conduit 1304 is then coupled to a manifold 1306, which extends from the conduit 1304 to the effluent containment pouch 1305. The use of the manifold 1306 allows containment vessel having a smaller cross-sectional area to direct effluent to the effluent containment pouch 1305. At the same time, the larger conduit 1304 can span all ports, directing effluent from the ports into the manifold 1306.

While the manifold 1306 and the conduit 1304 join to form a T-shape in FIG. 13, it should be noted that this is only one illustrative embodiment. In other embodiments the manifold 1306 can be configured to include turns, twists, redirection, and other changes in shape to direct effluent along the path defined by the manifold 1306 to the effluent containment pouch 1305. Additionally, as with the containment system (1200) of FIG. 12, the containment system 1300 of FIG. 13 allows a designer to locate the effluent containment pouch 1305 at a location that is distally displaced from the containment housing 1301.

Figure 14:
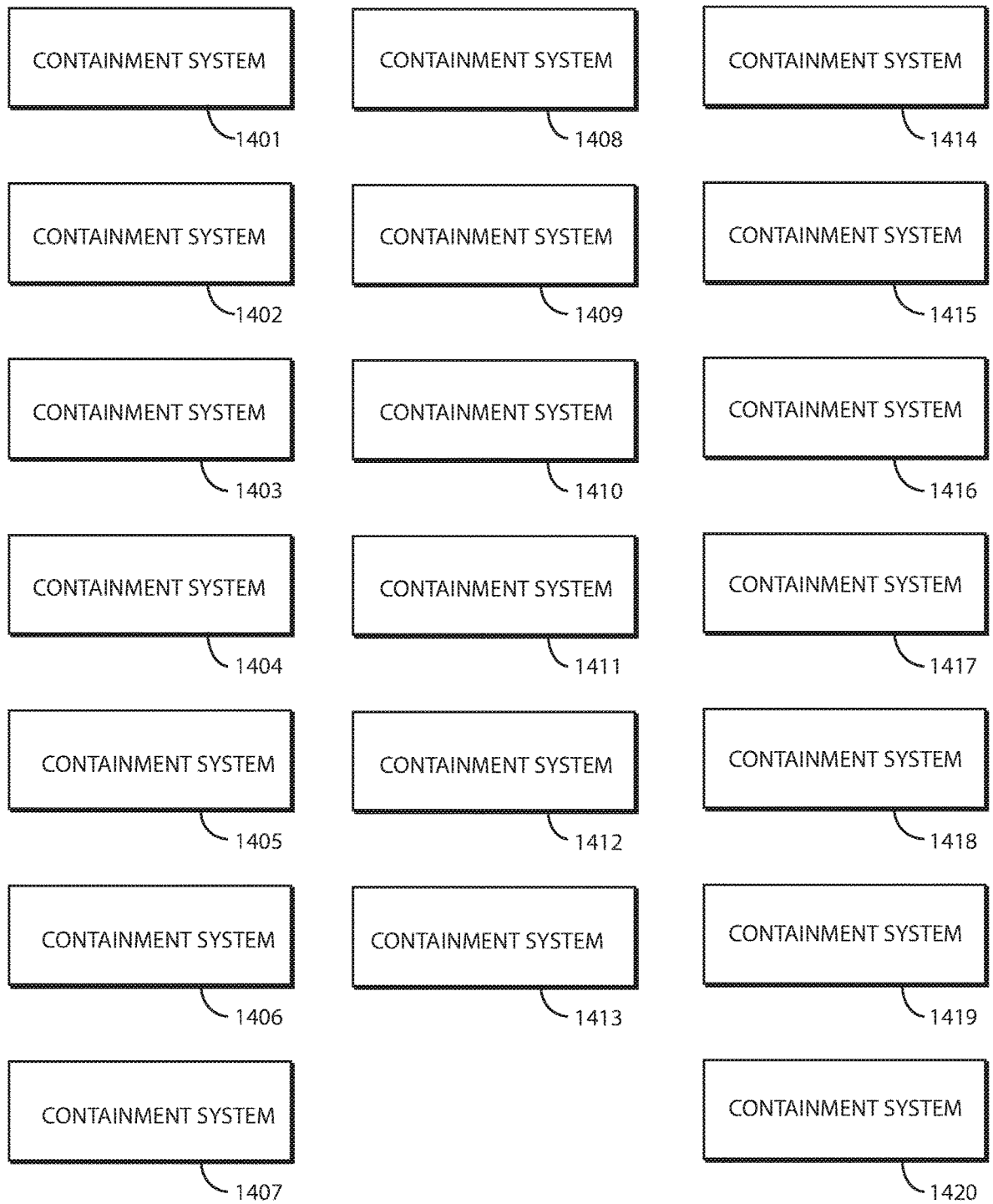
FIG. 14 illustrates various embodiments of the disclosure.

Turning now to FIG. 14, illustrated therein are various embodiments of the disclosure. At 1401, a containment system comprises a housing and a battery pack situated within the housing. At 1401, one or more ports are defined in, and disposed along, a surface of the housing. At 1401, an effluent containment pouch is coupled to the surface of the housing. At 1401, the effluent containment pouch spans the one or more ports.

At 1402, the effluent containment pouch of 1401 is collapsed against the surface of the housing when the effluent containment pouch is in an unactivated state. At 1403, the effluent containment pouch of 1402 defines one or more folds when the effluent containment pouch is in the unactivated state. At 1404, the effluent pouch of 1403 is hermetically sealed to the housing.

At 1405, the effluent containment pouch of 1402 expands in response to an electrochemical cell of the battery pack experiencing a thermal runaway condition. At 1406, the effluent containment pouch of 1405 receives and contains effluent from the electrochemical cell during the thermal runaway condition.

At 1407, the housing of 1405 further comprises one or more safety valves. At 1407, the one or more safety valves seal the one or more ports of the housing. At 1408, the one or more safety valves of 1407 rupture when the electrochemical cell experiences the thermal runaway condition.

At 1409, the effluent containment pouch of 1402 comprises a multi-layer blanket. At 1410, the multi-layer blanket of 1409 comprises a first layer. At 1410, the first layer comprises silica aerogel insulation.

At 1411, the multi-layer blanket of 1410 further comprises a second layer. At 1411, the second layer comprises Kevlar.sup.™ cloth.

At 1412, the multi-layer blanket of 1411 further comprises a third layer. At 1412, the third layer comprises a Mylar.sup.™ barrier.

At 1413, the first layer of 1412 defines an interior of the effluent containment pouch. At 1413, the third layer of 1412 defines an exterior of the effluent containment pouch. At 1414, the containment system of 1413 further comprises one or more of a conduit or a manifold disposed between the housing and the effluent containment pouch.

At 1415, a containment system comprises a battery pack comprising one or more electrochemical cells. At 1415, the containment system comprises a housing comprising a base and a lid. At 1415, the base is joined to the lid to seal the battery pack within the housing.

At 1415, one or more ports are defined along the housing. At 1415, an effluent containment pouch is attached to the housing. At 1415, the effluent containment pouch spans the one or more ports.

At 1415, when at least one electrochemical cell of the one or more electrochemical cells experiences a thermal runaway condition, the effluent containment pouch expands to transition from an unactivated state to an activated state. At 1416, the effluent containment pouch defines one or more folds when in the unactivated state.

At 1417, the one or more electrochemical cells of 1415 comprise less than ten electrochemical cells. At 1417, the effluent containment pouch has an interior volume greater than eight times of a volume of the battery pack.

At 1418, the one or more electrochemical cells of 1415 comprise more than twenty electrochemical cells. At 1418, the effluent containment pouch has an interior volume less than three times of a volume of the battery pack.

At 1419, a containment system comprises a containment housing defining one or more ports. At 1419, at least one effluent containment pouch is attached to the containment housing. At 1419, the at least one effluent containment pouch spans the one or more ports.

At 1419, the at least one effluent containment pouch comprises a multi-layer blanket. At 1419, the multi-layer blanket comprises at least a first layer comprising silica aerogel insulation, at least a second layer comprising Kevlar.sup.™ cloth, and at least a third layer comprising a Mylar.sup.™ barrier.

At 1420, the one or more ports of 1419 comprise a first set of ports disposed along a first side of the containment housing and a second set of ports disposed along a second side of the containment housing. At 1420, the at least one effluent containment pouch comprises a first effluent containment pouch coupled to the first side of the containment housing and spanning the first set of ports and a second effluent containment pouch coupled to the second side of the containment housing and spanning the second set of ports.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A containment system, comprising:
   a housing;
   a battery pack situated within the housing;
   one or more ports disposed along an exterior surface of the housing; and
   an effluent containment pouch coupled to the exterior surface of the housing and spanning the one or more ports.

2. The containment system of claim 1, the effluent containment pouch collapsed against the surface of the housing when in an unactivated state.

3. The containment system of claim 2, the effluent containment pouch defining one or more folds when in the unactivated state.

4. The containment system of claim 3, the effluent containment pouch hermetically sealed to the housing.

5. The containment system of claim 2, the effluent containment pouch expanding in response to an electrochemical cell of the battery pack experiencing a thermal runaway condition.

6. The containment system of claim 5, the effluent containment pouch receiving and containing effluent from the electrochemical cell during the thermal runaway condition.

7. The containment system of claim 5, further comprising one or more safety valves sealing the one or more ports of the housing.

8. The containment system of claim 7, the one or more safety valves rupturing when the electrochemical cell experiences the thermal runaway condition.

9. The containment system of claim 2, the effluent containment pouch comprising a multi-layer blanket.

10. The containment system of claim 9, the multi-layer blanket comprising a first layer, the first layer comprising silica aerogel insulation.

11. The containment system of claim 10, the multi-layer blanket further comprising a second layer, the second layer comprising Kevlar™ cloth.

12. The containment system of claim 11, the multi-layer blanket further comprising a third layer, the third layer comprising a Mylar™ barrier.

13. The containment system of claim 12, the first layer defining an interior of the effluent containment pouch, the third layer defining an exterior of the effluent containment pouch.

14. The containment system of claim 13, further comprising one or more of a conduit or a manifold disposed between the housing and the effluent containment pouch.

15. A containment system, comprising:
   a battery pack comprising one or more electrochemical cells;
   a housing comprising a base and a lid, the base joined to the lid to seal the battery pack within the housing;
   one or more ports defined along the housing; and
   an effluent containment pouch attached to the housing and spanning the one or more ports;
   wherein when at least one electrochemical cell of the one or more electrochemical cells experiences a thermal runaway condition, the effluent containment pouch expands to transition from an unactivated state to an activated state.

16. The containment system of claim 15, the effluent containment pouch defining one or more folds when in the unactivated state.

17. The containment system of claim 15, wherein the one or more electrochemical cells comprise less than ten electrochemical cells, further wherein the effluent containment pouch has an interior volume greater than eight times of a volume of the battery pack.

18. The containment system of claim 15, wherein the one or more electrochemical cells comprise more than twenty electrochemical cells, further wherein the effluent containment pouch has an interior volume less than three times of a volume of the battery pack.

19. A containment system, comprising:
- a containment housing defining one or more ports; and
- at least one effluent containment pouch attached to the containment housing and spanning the one or more ports;
- the at least one effluent containment pouch comprising a multi-layer blanket comprising at least a first layer comprising silica aerogel insulation, at least a second layer comprising Kevlar™ cloth, and at least a third layer comprising a Mylar™ barrier.

20. The containment system of claim 19, the one or more ports comprising a first set of ports disposed along a first side of the containment housing and a second set of ports disposed along a second side of the containment housing, the at least one effluent containment pouch comprising a first effluent containment pouch coupled to the first side of the containment housing and spanning the first set of ports and a second effluent containment pouch coupled to the second side of the containment housing and spanning the second set of ports.

* * * * *